No. 644,538. Patented Feb. 27, 1900.
A. PFANNENBERG.
VOLTAIC CELL.
(Application filed Apr. 15, 1899.)

(No Model.)

Attest

Inventor
A. Pfannenberg
by
Atty.

United States Patent Office.

ALBERT PFANNENBERG, OF BERLIN, GERMANY.

VOLTAIC CELL.

SPECIFICATION forming part of Letters Patent No. 644,538, dated February 27, 1900.

Application filed April 15, 1899. Serial No. 713,174. (No model.)

*To all whom it may concern:*

Be it known that I, ALBERT PFANNENBERG, a subject of the King of Prussia, German Emperor, residing at Berlin, in the Kingdom of Prussia, German Empire, have invented certain new and useful Improvements in Voltaic Cells, of which the following is a full, clear, and exact specification.

The subject of the present invention is an improved voltaic cell having a peculiarly-formed carbon electrode.

The essential feature of the new cell consists in the inner carbon cylinder of a carbon zinc cell having a deep groove or channel cut in the part which dips into the exciting fluid, whereby the efficiency of the cell is greatly increased without extra space being required, and at the same time a central and rigid support for the electrodes relatively to one another is secured.

The accompanying drawings show one manner of carrying the invention into effect.

Figure 1:
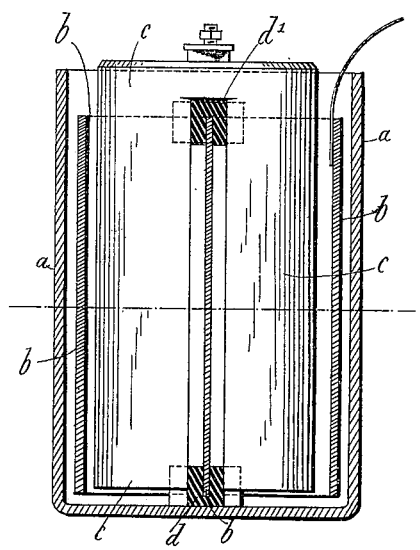
Figure 2:
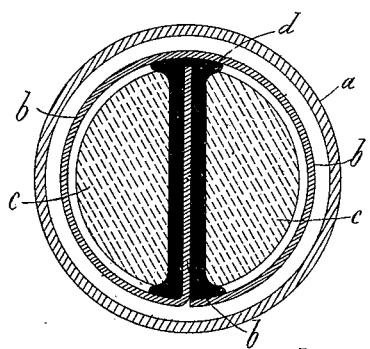
Figure 3:
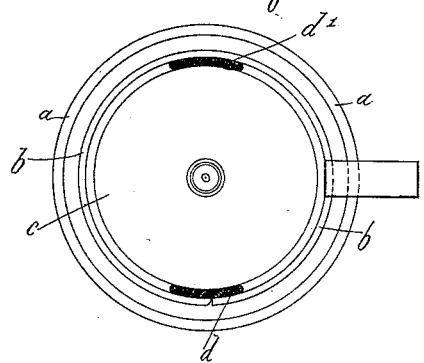

Figure 1 is a vertical section, Fig. 2 a cross-section, and Fig. 3 a plan view, of the cell.

$a$ is a glass containing vessel, in which is placed a zinc cylinder $b$, surrounding the carbon electrode $c$. The feature of this latter is that that part which dips into the fluid is divided by a deep radial groove or channel. In this manner, while the strength of the electrode is not interfered with, a large increase of surface is secured, a matter of great importance as regards the efficiency of the cell.

The channel between the two shanks of the carbon cylinder admits of the effective surface of the zinc electrode being greatly increased. As shown on the drawings, the zinc plate is not joined to form a closed casing, but one end passes through the channel and forms a cross-piece abutting on the other side against the inside of the casing. The arrangement shown has, further, the purpose of securing an exact and rigid support for the two electrodes relatively to one another. For this purpose supporting and insulating blocks $d$ and $d'$, of wood or the like, are shaped to correspond to the form of the channel in the carbon electrode. These blocks are adjusted so as to abut against the zinc electrode at either end and are each provided with a groove to receive the cross-piece of the zinc electrode. The lower block $d$ likewise serves to support the electrodes inside the glass containing vessel and for this reason projects below the bottom of the zinc cylinder, thus preventing the zinc from striking upon the glass bottom.

I claim—

1. A voltaic cell comprising a carbon electrode, that part of the same which dips into the exciting fluid being divided by a deep groove or channel, for the purpose of increasing the effective surface and a tubular positive electrode, having one end bent inward and passing through said channel, all substantially as described.

2. A voltaic cell comprising a carbon electrode, that part of the same which dips into the exciting fluid being divided by a deep groove or channel, for the purpose of increasing the effective surface and a tubular electrode having one end bent inward and passing through said channel, and insulating-blocks fitting said channel and engaging said end, substantially as described.

In witness whereof I have hereunto set my hand in presence of two witnesses.

ALBERT PFANNENBERG.

Witnesses:
HENRY HASPER,
WOLDEMAR HAUPT.